United States Patent
Ene et al.

(10) Patent No.: US 12,198,118 B2
(45) Date of Patent: *Jan. 14, 2025

(54) METHOD AND SYSTEM FOR AUGMENTED FEATURE PURCHASE

(71) Applicant: Supertab AG, Steinhausen (CH)

(72) Inventors: Cosmin-Gabriel Ene, Zollikon (CH); Martin Hans, Bad Salzdetfurth (DE); Marcel Erni, Zug (CH)

(73) Assignee: Supertab AG (CH)

( * ) Notice: Subject to any disclaimer, the term of this patent is extended or adjusted under 35 U.S.C. 154(b) by 30 days.

This patent is subject to a terminal disclaimer.

(21) Appl. No.: 18/077,472

(22) Filed: Dec. 8, 2022

(65) Prior Publication Data

US 2023/0162169 A1    May 25, 2023

Related U.S. Application Data

(63) Continuation-in-part of application No. 17/254,708, filed as application No. PCT/EP2019/066512 on Jun. 21, 2019, now Pat. No. 11,704,652.

(Continued)

(51) Int. Cl.
*G06Q 20/12* (2012.01)
*G06Q 20/24* (2012.01)
(Continued)

(52) U.S. Cl.
CPC ......... *G06Q 20/1235* (2013.01); *G06Q 20/24* (2013.01); *G06Q 20/401* (2013.01); *G06Q 20/405* (2013.01); *G06Q 30/0643* (2013.01)

(58) Field of Classification Search
CPC .. G06Q 20/1235; G06Q 20/24; G06Q 20/401; G06Q 20/405; G06Q 30/0643
See application file for complete search history.

(56) References Cited

U.S. PATENT DOCUMENTS 9,336,541 B2   5/2016  Pugazhendhi et al.
10,430,559 B2  10/2019 Anantharaman
(Continued)

FOREIGN PATENT DOCUMENTS

WO    2016081660 A1    5/2016

OTHER PUBLICATIONS

Sarah Perez, "Amazon's Flow App Brings Barcode Scanning & Augmented Reality To Android Users," Jul. 2, 2012, TechCrunch, https://techcrunch.com/2012/07/02/amazons-flow-app-brings-barcode-scanning-augmented-reality-to-android-users/ (Year: 2012).*

(Continued)

*Primary Examiner* — Raven E Yono

(57) ABSTRACT

A computer-implemented augmented reality-based method provides a user device access to data content by processing of a camera image captured by the user device to identify a candidate visual area, which is then processed to identify visual features indicative of available data content. The identified features are compared to visual features of database objects indicative of available data content, and a determination is made regarding the object that corresponds to the identified features. Instructions are then generated to augment a display of the camera image with selectable image features. In response to a selection of one of the selectable image features based on a multi-function transaction status indicator, a determination is made regarding whether the user device has permission to access the data content associated with the selected image feature. If not, a payment settlement arrangement is implemented for the user device to gain access permission to the data content.

24 Claims, 12 Drawing Sheets

Related U.S. Application Data

(60) Provisional application No. 62/704,014, filed on Jun. 21, 2018.

(51) Int. Cl.
*G06Q 20/40* (2012.01)
*G06Q 30/0601* (2023.01)

(56) References Cited

U.S. PATENT DOCUMENTS

| | | | |
|---|---|---|---|
| 2012/0087589 A1 | 4/2012 | Chang-Tsun | |
| 2013/0218721 A1* | 8/2013 | Borhan | G06Q 30/02 705/26.41 |
| 2013/0332318 A1 | 12/2013 | D'Auria et al. | |
| 2014/0122593 A1* | 5/2014 | Bachman | H04L 67/06 709/204 |
| 2015/0070347 A1* | 3/2015 | Hofmann | G06F 3/0346 345/419 |
| 2015/0186984 A1 | 7/2015 | Loganathan | |
| 2015/0310601 A1 | 10/2015 | Rodriguez et al. | |
| 2016/0148304 A1* | 5/2016 | Srinath | G06F 16/955 705/27.1 |
| 2017/0004487 A1 | 1/2017 | Hagen et al. | |
| 2017/0039613 A1 | 2/2017 | Kaehler et al. | |
| 2017/0083185 A1 | 3/2017 | Huang | |
| 2017/0345195 A1* | 11/2017 | Eatedali | G06Q 20/123 |
| 2018/0150831 A1 | 5/2018 | Dolan et al. | |
| 2018/0150892 A1 | 5/2018 | Waldron et al. | |
| 2018/0204276 A1 | 7/2018 | Tumey | |
| 2018/0367306 A1 | 12/2018 | Bahety et al. | |
| 2019/0080172 A1 | 3/2019 | Zheng et al. | |

OTHER PUBLICATIONS

Scott G. Dacko, "Enabling smart retail settings via mobile augmented reality shopping apps," dated Oct. 14, 2016, Elsevier, https://www.sciencedirect.com/science/article/pii/S0040162516304243 (Year: 2016).*
Aasha Bodhani, "Getting a purchase on AR," dated May 2013, Engineering & Technology, https://digital-library.theiet.org/content/journals/10.1049/et.2013.0408 (Year: 2013).*
The International Search Report and Written Opinion, mailed on Oct. 7, 2019, in the corresponding PCT Appl. No. PCT/EP2019/066512.
The Written Opinion of the International Preliminary Examining Authority, mailed on Jan. 29, 2020, in the corresponding PCT Appl. No. PCT/EP2019/066512.

* cited by examiner

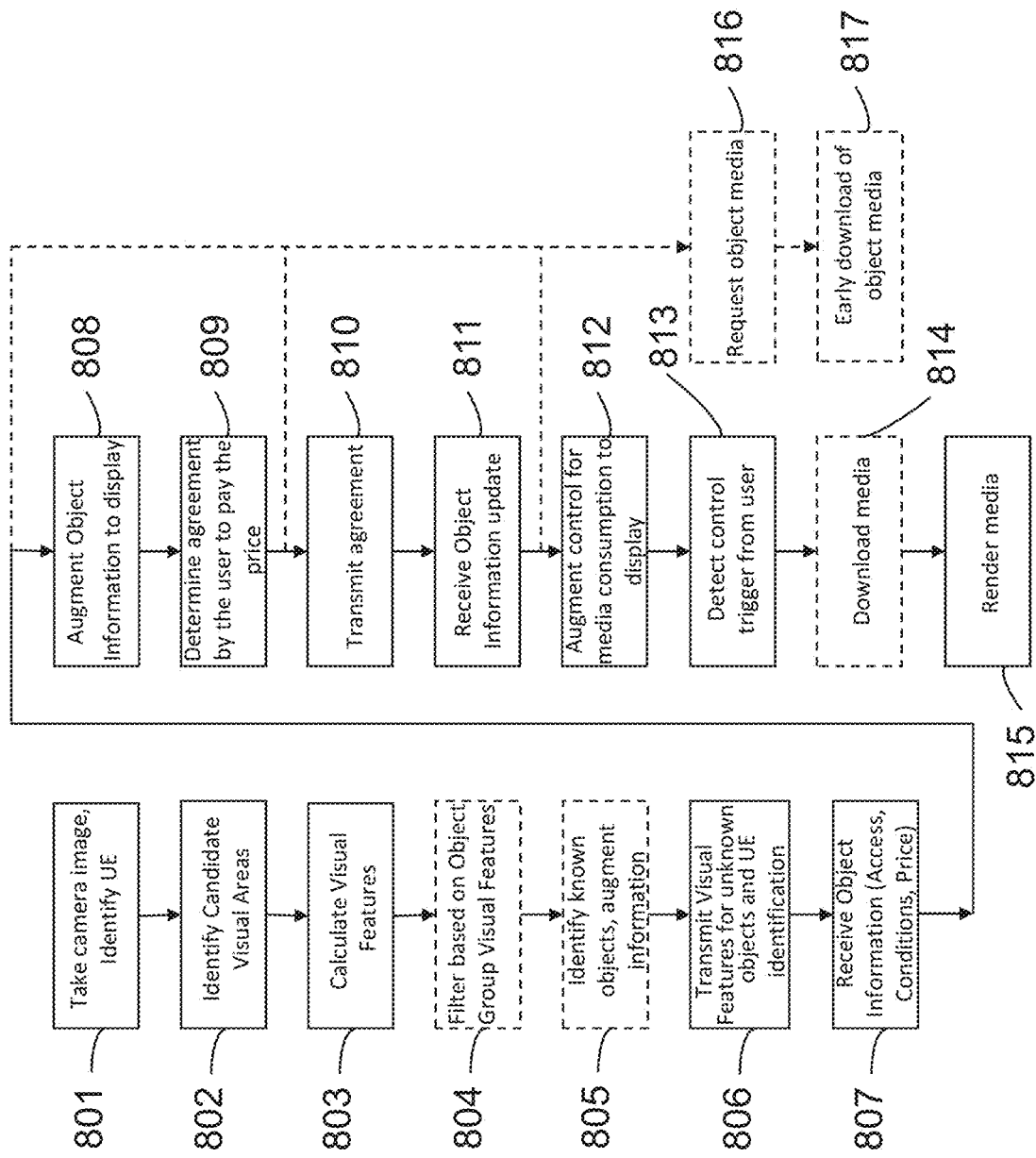

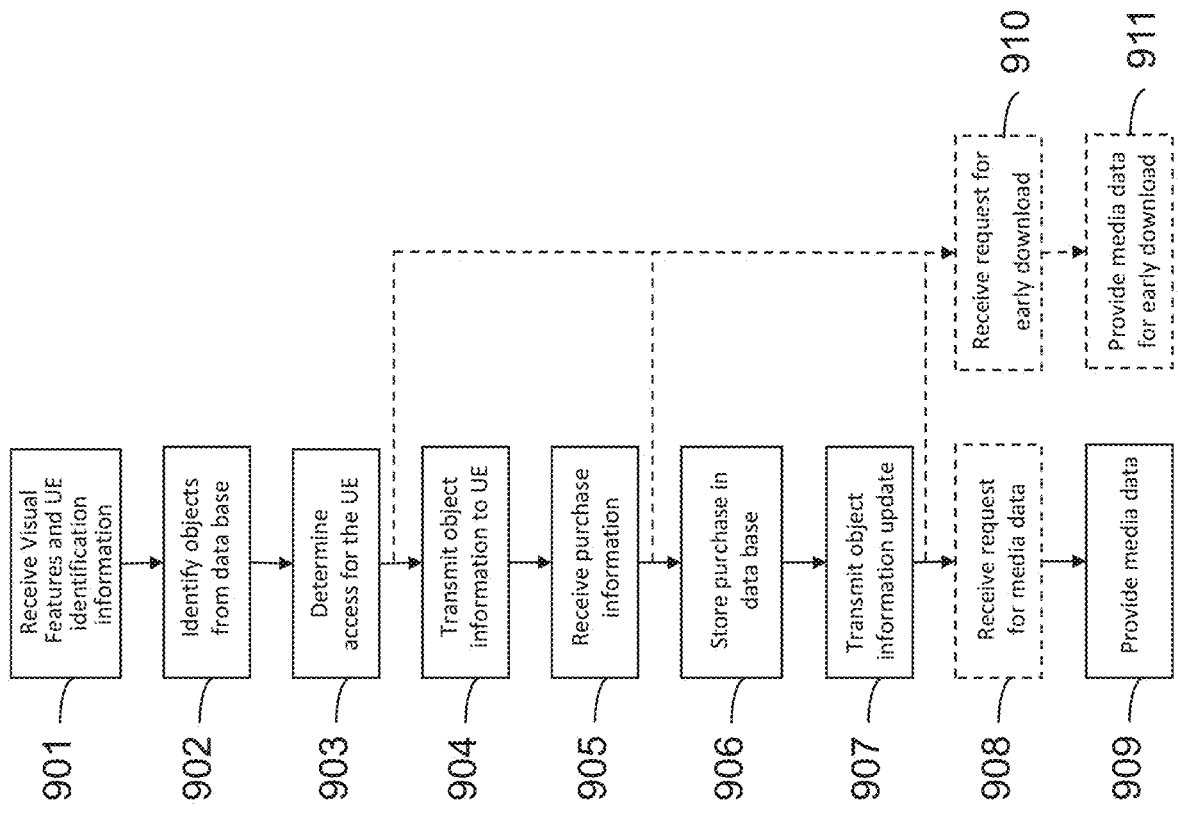

METHOD AND SYSTEM FOR AUGMENTED FEATURE PURCHASE

CROSS-REFERENCE TO RELATED PATENT APPLICATIONS

This application is a continuation-in-part patent application of U.S. patent application Ser. No. 17/254,708, filed on Dec. 21, 2020, which claims priority to PCT Patent Application No. PCT/EP2019/066512, filed Jun. 21, 2019, which claims priority to U.S. Patent Application No. 62/704,014, Filed on Jun. 12, 2018, each of which are hereby incorporated by reference in their entirety herein.

FIELD OF THE INVENTION

This disclosure pertains to methods for accessing digital content by recognizing associated visual features in a display image of a user device, and more particularly, for accessing the digital content by means of a payment settlement arrangement that authorizes access.

BACKGROUND

For online shopping, various possibilities exist to pay for ordered goods. Online shops often request new users to register with their real name and email address. During the shopping process, the mail address for shipping non-digital goods and credit card information is requested before a purchase is finally accepted by the online-shop. For digital goods like audio or video media data, the process is very much the same without the mailing address.

Alternatives to providing a credit card are various other types of bank accounts. Another alternative is to transfer money to the online shop via Bitcoin, a virtual currency.

Existing payment systems offer a payment service to shops and customers that have benefits over the simple registration described above. Some services include a registration only at the payment service, usually trusted by customers. These services require only an email address to be provided to the online shop. The shop then requests settlement of a bill from the payment service and based on the mail address and the customer's registration the payment service communicates with the customer and finalizes the purchase, finally providing the registered shipping address to the online shop.

These and other payment services have in common, that they require not only an agreement to pay before the purchase is actually finalized, but already the payment to have taken place. For digital goods this means, the credit card is debited or the payment service transfers the purchase amount to the online shop before the digital data is delivered to the customer.

An exception of this basic mechanism is introduced in U.S. Patent Publication No. 2014/0258106 A1 to Ene ("the '106 publication"), which is hereby incorporated by reference in its entirety herein. The '106 publication describes a payment system and methods for a plurality of payment processes. The system and methods are invoked for a buyer system making a purchase in an online shop for a certain purchase amount. The system described by the '106 publication, for example, is configured to:

identify a buyer system, e.g. by loading a script within a web page onto the buyer system, executing the script to generate a fingerprint of the browser and transmitting the fingerprint information to the system, store the identification of the buyer system, e.g. the fingerprint information, store the purchase amount in relation to the identification number, monitor the total amount of purchases of the buyer system, receive a request from the online shop to account for the purchase amount, and send a request for settlement of at least a part of the total amount of purchases to a user of the buyer system only when the total amount of purchases exceeds a predefined value and/or after the expiry of a predefined time interval.

Simplified, the '106 publication describes a system that allows a buyer to make purchases online with a buyer system for a purchase amount which the buyer firstly does not have to settle. The payment system accumulates the amounts of purchases from the buyer system and only when the total amount of due payments exceeds a predefined value, the buyer is requested to settle the total amount or a part of it. The buyer system can be a PC or a mobile phone or the like. The purchases and purchase amounts are stored by the payment system in relation to a buyer system identification, which does not include an identification of the buyer, or a registration or any other user interaction.

However, it may be difficult to unambiguously identify the buyer system in lieu of identifying the buyer. While browser fingerprinting provides one possible mechanism, the fingerprint generation process may fail. In addition, users may use multiple browsers on a single device leading to multiple identifications.

Internet-accessible services from Shazam Entertainment LLC. ("SHAZAM") enable media to be analyzed for determining a media fingerprint, for example, to identify pieces of media from a user's environment and offer the same or related media for purchase to the user. SHAZAM originally started audio sample recognition using samples taken by the microphone of a user and analyzing these to identify a played piece of music that is in turn identified to the user and optionally offered for purchase as described at, e.g., news-.shazam.com/pressreleases/shazam-introduces-visual-recognition-capabilities-opening-up-a-new-world-of-shazamable-content-1168520, last accessed Aug. 18, 2022.

Further, pattern recognition from camera images is well known (for example, QR-Code recognition). A recognized QR-Code may, for example, be used to link a user to a website offering information or goods for purchase. Forensic Pathways of Birmingham, England ("FORENSIC PATHWAYS") offers a software-based Forensic Image Analyser (FIA), which extracts a latent feature, known as, Sensor Pattern Noise (SPN) from digital images generated by a silicon video chip as described at, e.g., www.forensic-pathways.com/source-camera-identification-using-forensic-image-analyser/, last accessed Aug. 18, 2022. SPN occurs due to the natural imperfections in the silicon chip and varying pixel sensitivity to light in the sensor of the camera. The uniqueness of these defects makes SPN a natural digital 'fingerprint'. Importantly, SPN can be used to differentiate between imaging devices of the same model. For example, the software can distinguish between the camera fingerprints of two iPhone 6 devices. It is important to note that these SPN fingerprints contain no content. Thus, the fingerprints can be shared without compromising security.

'Standard SPN' fingerprints are contaminated by scene details in the image, which leads to misidentifications. This is not at all helpful in forensic terms. FORENSIC PATHWAYS has developed a unique 'SPN enhancer' that removes contamination from the standard SPN fingerprints and allows for higher identification rates (see, e.g., U.S. Pat. No. 8,565,529 to Chang-Tsun et al., which is hereby incorporated by reference in its entirety herein).

With the growing availability of augmented reality (AR) techniques for everyday life, e.g. in form of glasses equipped with AR, there is the need for a purchase system for purchasing digital goods easily. Prior-art is silent about a fast and easy visual selection of digital media content that offers a direct media consumption opportunity. Direct in this sense means a detection, selection, purchase and consumption without the need for user identification or login-in. For example, a user having AR glasses sees an interesting magazine cover printed or displayed, e.g. as an advertisement or read by someone near-by. Obviously there is the need for a way to select and purchase the magazine for reading without using browser or application means to identify and select the magazine issue of interest and without the need to provide payment information in form of credit card or login information.

Also, if using a mobile phone to capture the surrounding comprising printed or displayed representation of digital goods, an easy and direct way is required to identify, purchase, download and consume digital goods of interest without penetrating the user with requests to login of typing. The current invention provides such easy and direct way to consume digital content identified from a camera view.

SUMMARY

By way of example, aspects of the present disclosure are directed to methods for providing a user device ("user equipment," or "UE") with the ability to access data content by identifying Visual Features of a Candidate Visual Area that has been imaged by the UE and contains a physical artifact identifying the data content (for example, visual features of a magazine cover identifying a magazine with data content) available from a Content Provider ("CP").

In particular, a computer-implemented method for providing user access to data content includes the steps of:
 a. processing a camera image generated by the UE, said image of an environment to identify at least one candidate visual area therein;
 b. processing the at least one identified candidate visual area to further identify visual features to be evaluated as indicative of available data content;
 c. comparing the identified visual features to be evaluated as indicative of available data content relative to visual features of at least one data object maintained by a database, said data objects indicative of respective available data content;
 d. determining based on the comparing step, the at least one data object that corresponds to the identified visual features of the at least one candidate visual area;
 e. determining whether said UE has permission to gain access to available data content corresponding to the determined at least one data object that corresponds to the identified visual features;
 f. generating instructions to augment a display of the camera image on the UE with selectable image features associated with the determined at least one data object that corresponds to the identified visual features of the at least one candidate visual area, said instructions to augment the display of the camera image with the selectable image features proximate to the corresponding at least one candidate visual area, said selectable image features indicative of whether or not the UE has permission to access to the data content corresponding to the at least one data object;
 g. generating instructions to further augment the display to provide (i) a transaction status indicator upon the user device's tracking of the user's view and detecting that the user is viewing one of the selectable image features for which the user device does not have permission to access to the data content for the corresponding at least one data object, wherein the transaction status indicator indicates (A) the cost for access to the data content of the data object associated with the viewed selectable image feature, (B) a predetermined maximum threshold amount before triggering a payment settlement requirement, and (C) any prior unsettled payment obligations, (ii) provide a sequence of images associated with the transaction status indicator while the user is continuously viewing the selectable feature for a predetermined time duration to confirm purchase of access to the data content corresponding to the data object associated when the viewed selectable image feature, and (iii) confirm the user's intent to purchase access to the digital content corresponding to the data object associated when the selectable image feature when the user continuously views such image feature for the predetermined duration time;
 h. transmitting a transaction authorization signal to a CP offering the digital content of the selected data object without concurrently requiring payment for the transaction, when the total aggregate cost is less than the predetermined maximum amount; and
 i. executing a payment settlement arrangement for the user device for settlement of at least a part of the total aggregate cost including the cost of the intended purchase would be equal or are greater than the predetermined maximum amount, and upon such payment settlement, transmitting a transaction authorization signal to the content provider offering the digital content corresponding to the data object associated when the viewed selectable image feature.

This SUMMARY is provided to briefly identify some aspects of the present disclosure that are further described below in the DESCRIPTION. This SUMMARY is not intended to identify key or essential features of the present disclosure nor is it intended to limit the scope of any claims.

BRIEF DESCRIPTION OF THE DRAWINGS

A more complete understanding of the present disclosure may be realized by reference to the accompanying drawing in which:

FIG. 8 presents a flow diagram illustrating a method for augmented feature purchase in accordance with aspects of the present disclosure;

FIG. 9 presents a flow diagram illustrating another method for augmented feature purchase in accordance with aspects of the present disclosure;

DETAILED DESCRIPTION

Figure 1:
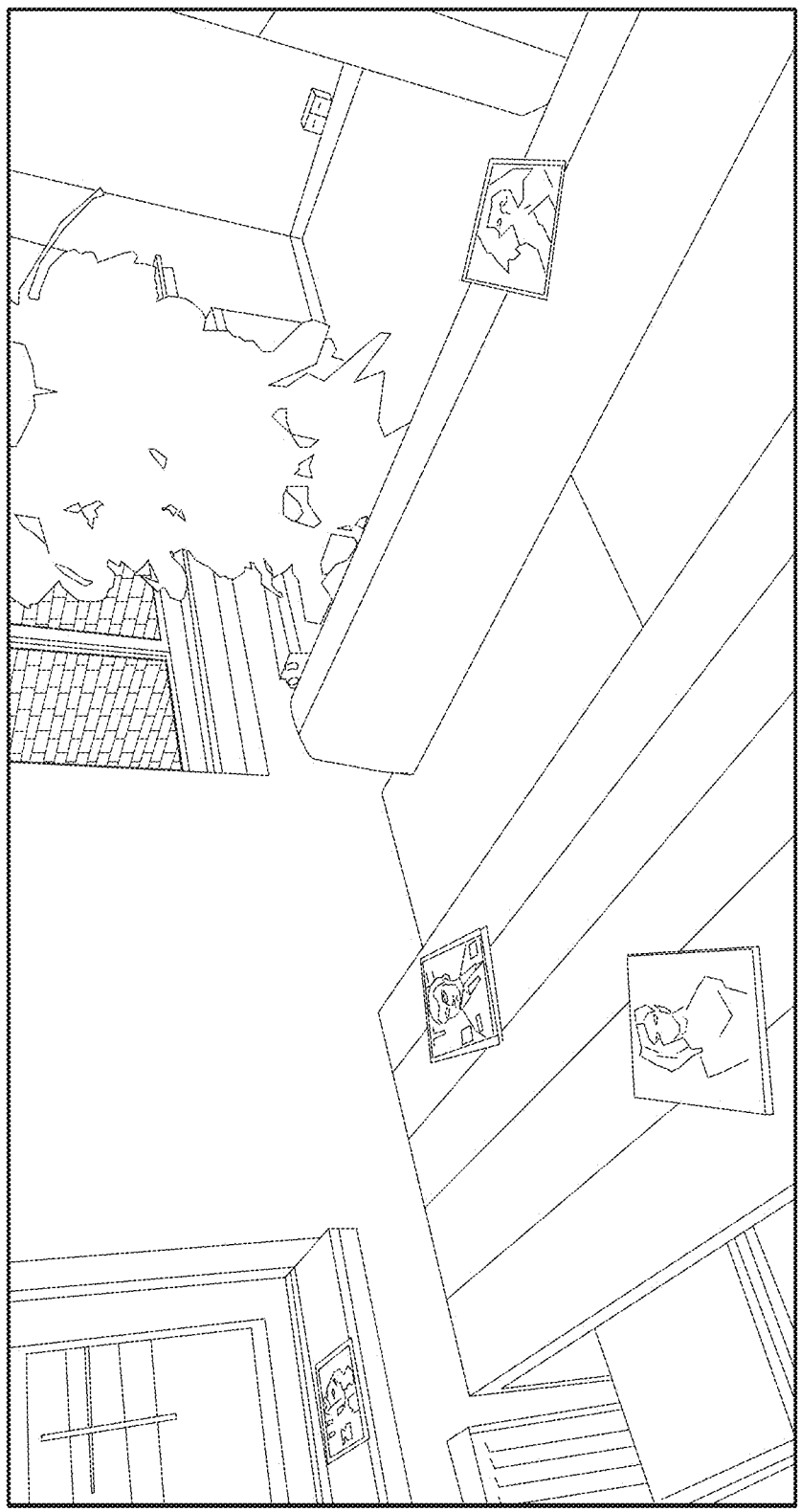
FIG. 1 illustrates a camera image as may be scanned by a UE in accordance with aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements later developed that perform the same function, regardless of structure.

Unless otherwise explicitly specified herein, the drawings are not drawn to scale.

In the following description, the same reference signs are used for the same and similarly acting parts.

For ease of description, definitions for a number of relevant terms are provided below.

A Candidate Visual Area is an area of an image taken by the camera of a mobile device, the area is identified as potentially comprising an image of an object of interest. The Candidate Visual Area generally relates to a sub-image of the original camera image that shows an area of interest of the original image. The Candidate Visual Area may be the result of shaping, edging, cutting or other manipulation of the area of interest of the original image.

The Candidate Visual Area is typically extracted from an image by the mobile device. Examples include the rectangular area around an image whose shape potentially show magazine covers. The area of the image may be a distorted rectangular area that is rectified by the mobile device to constitute the Candidate Visual Area.

A Visual Feature is a digital vector, i.e. a set of parameter values, representing certain characteristics of a Candidate Visual Area. The Visual Feature may, for example, be calculated from a Candidate Visual Area by a mobile device using one or more algorithms specifically designed to determine characteristics related to the similarity of the area to pre-determined image media.

An example of a Visual Feature may be a digital vector comprising 256 parameters describing a Candidate Visual Area in a standardized or normalized way. The characteristics represented by the Visual Feature may be rotation and/or scale invariant, so that the rotation of a magazine cover in the original camera image and the distance between the camera and the magazine cover does not significantly impact the calculation of the Visual Feature. The calculation of a Visual Feature is typically done in a UE device and may alternatively also be done in a server of a network.

An Encoded Visual Feature is a digital representation of a Visual Feature reversibly encoded to allow more efficient, faster, more frequent or otherwise enhanced transmission of the Visual Feature over a mobile communication link. The receiver of an Encoded Visual Feature can decode it to restore the Visual Feature.

For example, an Encoded Visual Feature may be a compressed Visual Feature, the compression for example being lossless to allow exact restoring by a receiver. A Visual Feature is typically encoded or compressed by a mobile device, and decoded or decompressed by an entity of the network.

An Object Database is a database of objects comprising, for each of a multiplicity of objects, one or more Visual Features, image media of a specific image media type, and potentially more information.

The Object Database may typically be part of a network. Alternatively, the Object Database may be stored in the mobile device. The Object Database may for example comprise hundreds or thousands of magazine cover images and Visual Features calculated from the images by the network. A database entry for a single object may also comprise multiple Visual Features or Visual Feature range information for determining the likelihood that a given Visual Feature represents the magazine cover image, and thus matches the object.

A Candidate Object is an object contained in the Object Database identified to match an object shown in a Candidate Visual Area and identified from the Object Database based on a Visual Feature of the Candidate Visual Area.

An entity of a network may for example identify a Candidate Object for a Visual Feature received from a mobile device. Candidate Objects will have network-stored Visual Features that match the Visual Feature received exactly or with a high likelihood.

An Object Group is a group of objects in an Object Database that typically have a common look and that may share several parameters in common. The common look leads the Visual Features of the Object Group to be similar, i.e. the Visual Features of objects in the same Object Group have a limited Euclidean distance of each other.

An example for an Object Group in an Object Database comprising magazine covers is the group of all magazines with the same title (e.g. "Time Magazine"). These typically share a common layout and design, and therefore have similar Visual Features.

An Object Group Visual Feature is a digital vector representing the common characteristics of an Object Group. The Visual Feature of each object in an Object Group has a limited Euclidean distance, or is otherwise near or similar to the Object Group Visual Feature.

For the example group above, the Object Group of magazines of the same title may have one Object Group Visual Feature representing the typical layout and design of the title, without comprising any specifics of a single issue of the magazine.

In general, Object Group Visual Features provide information that enables the filtering of Candidate Visual Areas based on an individual Visual Feature for areas comprising known objects of interest and filtering out unknown areas. For example, the filtering may be based on factual groups as in the example above. The filtering may also be based on a pure mathematical description of a group of objects, or it may be based on a single general description of Visual Features of all objects in a database. An example for the latter type is an Object Group Visual Feature describing the general typical characteristics of images of magazine covers, regardless of title and issue of the magazine.

Several additional relevant terms are also described below.

Camera Image is used throughout this disclosure to represent any of an image, a video, a live photo or small video and a multiplicity of images, taken by one or more cameras of a mobile device, all substantially covering the same scene.

User Equipment (UE) is used throughout this disclosure to represent any mobile device that is equipped with one or more cameras and communication means, and that is able to perform the described functionality. A UE is not restricted to be a handheld device, it may be mounted to a vehicle or it may be fixed but movable (e.g. nomadic). In other words, aspects of the disclosure unless otherwise stated are presumed to be is independent of the UE's form factor, size or the general purpose of the device.

An Act of Augmenting Data into a Currently Displayed Image is used throughout this disclosure to describe the overlay of a current camera image and additional image data to a currently displayed overlay image by the UE. The overlay image may be displayed on the UE or on a peripheral connected to the UE (e.g. a projector, a virtual reality display, augmented reality glasses, and so on). The overlay may be such that additional image data, e.g. image data of an object, text relating to an object or an object name and/or description, is shown next to, in proximity to, on top of (thereby covering) or otherwise in relation to a Candidate Visual Area related to the object. The area of the overlay image that shows the augmented data, or parts thereof, may be touch sensitive or otherwise offer the user means to trigger activities by activating the respective areas.

Aspects of the present disclosure are described with reference to FIGS. 8 and 9, which depict flow diagrams associated with a UE and a Content Provider, respectively.

With reference to FIG. 8, at steps 801 and 802, a UE uses its camera to take a camera image of the environment and determine Candidate Visual Areas therein. The UE in parallel generates identity information substantially identifying the UE (for example, by executing a browser-based fingerprint generation script, by reading available identification data from the UE's storage as part of an App installed on the UE or from a SIM card present in the UE; or by identifying the user with an image recognition means of the UE, a fingerprint sensor or the like). An alternative such as source camera identification may be used, as described in the Background section above.

At step 803, for each of the Candidate Visual Areas, the UE calculates Visual Features. The calculation may be performed for example using software that is pre-installed on the UE, for example, as part of an App, or that is downloaded during a browser session for execution on the UE (For example, a bowser session that also triggered generating the identity information and taking the camera image).

With reference to FIG. 9, the Visual Features and UE identification information may then be passed to a Content Provider at step 901 in order to consult an Object Database at step 902. The Object Database is consulted for identifying objects that are or may be (with high likelihood) present in the Candidate Visual Areas. To facilitate this, the Object Database is searched for objects in the camera image for which data is already known. The determination is based on a match of the Visual Features calculated for Candidate Visual Areas by the UE at step 803 of FIG. 8 with Visual Features stored in the Object Database with relation to the objects therein. The determination may, for example, be based on a calculation of a distance between the Visual Features of Candidate Visual Areas and a calculation of a distance between the Visual Features stored in relation to objects in the Object Database.

If object matches are identified, it may determine from the Object Database for each object whether one or more of the UE, the subscriber of the UE, or the current user of the UE, have permitted access to the identified object at step 903 of FIG. 9. It may further be determined at step 903 whether the identified object is locally stored on the UE for access by the user.

Returning to FIG. 8, for identified objects, the UE may augment object data from the Object Database into a currently displayed image at step 808. More specifically, if the UE has access to the object, the UE may augment the object data by giving access to the object to a currently displayed image. The augmented object data may for example include an image of the object or a pictogram representing the object. The augmentation of the object data may provide means to the user to trigger a presentation or rendering of the respective object (for example, provide a newspaper article for reading or play a video on a display).

If the UE does not have access to the object, the UE may augment object data to a currently displayed image by providing an image of the object and information about conditions necessary to access the object. The condition information may for example be a price to be agreed to or to be paid by the user to access the object. The condition information may comprise multiple alternative conditions to access the object (for example, multiple prices for multiple different purchase alternatives). The object data may alternatively provide means to the user to trigger the presentation of further information relating to the object, the further information may be price information and/or additional information about the object content (for example, a teaser or an abstract).

The Object Database accessed for steps 803 through 807 may reside in the UE. In this case, the determining step in 903 of FIG. 9 is alternatively performed in the UE, and objects that match Candidate Visual Areas of the camera image are identified from the Object Database by the UE. Access information may be stored as part of the object data in the Object Database, and if access is available to the UE, information about the presence of the actual object including the digital media data that constitutes the object may be stored in the Object Database or may be otherwise present in the UE. The augmented object data may provide an icon and/or iconic representation of access rights to directly access the content to the user. For example, if the object is accessible to the user, a small image of the object from the Object Database may be shown. The image may have a green background if the respective media data is accessible and already available on the UE as described for this alternative. If the object is not accessible, its representing image may be shown with gray background to show that a purchase is necessary before access is granted. This alternative is not depicted in FIGS. 8 and 9.

As previously noted, the Object Database accessed for steps 803 through 807 may instead reside in the network. In this case, the entity that comprises the Object Database and that may provide access to objects referenced by or contained in the Object Database is called a "Content Provider." The Content Provider may for example comprise a single server entity of the network, a group of servers or different separated sub-networks (for example, a database access sub-network and a content provider sub-network). Nothing in this disclosure should be interpreted to require a work-split between different network entities. Rather, the term Content Provider is just a notation for any and all functions implemented on the network side.

If the Object Database resides in the network, after the Visual Features are calculated by the UE in step 803 of FIG. 8, the UE may optionally execute an algorithm to encode the calculated Visual Features to Encoded Visual Features for the purpose of, for example, compressing the size of the data characterizing the Visual Features to reduce the size of such information for transmission. The UE may then transmit the Encoded Visual Features to a Content Provider for processing at step 806 of FIG. 8. Together with the Encode Visual Features, the UE may send the identity information determined at step 801 of FIG. 8. The Content Provider may decode the Encoded Visual Features to regain the original Visual Features, and then perform the determining step 903 of FIG. 9.

Based on the Visual Features received at step 901, objects are identified from the Object Database at step 902 of FIG. 9. Based on the UE identity information received at step 901, the Content Provider determines for each identified object whether the identified UE has access to the object at step 903. The determination of access may for example comprise involving a payment system and transmitting an object identification from the Object Database and the identity information to the payment system. The payment system may have stored access information in relation to the identity information and provide the Content Provider with the respective access information.

In carrying out step 901, for example, a data token may preferably be retrieved from the UE to provide an identifier of the UE. The identifier may, for example, be a generated device fingerprint, or be associated with a HTTP cookie.

At step 904 of FIG. 9, the Content Provider may then, based on the identified object and the access information, proceed to transmit to the UE object data, access information and/or access conditions. The object data may include an image of the object and further descriptive information such as a title, a teaser or an abstract. The access information may identify whether the UE has access to the object and for how long (if limited). The access conditions may comprise price information for purchasing the object for example including multiple alternative options to purchase access by the user.

At step 807 of FIG. 8, the UE receives the access information and conditions. The UE may then determine whether it has access or not and augment the object information presented on the UE display at step 808.

According to another aspect of the present disclosure, two Object Databases are provided in the system, one in the UE containing objects previously accessed by the UE, and one on the network side, containing all Candidate Objects that are known to the system. In this case, at step 805 of FIG. 8, the UE first performs a determining step to identify objects the UE has accessed or that the UE has identified in Candidate Visual Areas in the past. For identified objects that the UE has access to, the UE may at this point already augment information to a currently displayed image, the augmented information providing easy and instant access to the user.

The UE then transmits associated Visual Features (for example, in encoded form) to the Content Provider at step 806 in order to receive from the Content Provider information about access and conditions about objects not identified on the UE (FIG. 8, box 7). The sent (Encoded) Visual Features may preferably only comprise Visual Features of Candidate Visual Areas for which the UE did not identify an object to which the UE has access. Alternatively, Visual Features for which the UE has determined access, together with an object identification from the UE-based Object Database, may also be transmitted to the Content Provider in order to trigger the Content Provider to potentially updated information related to the object in its response.

With two Object Databases, the Content Provider may respond to the UE with object data for identified objects from the network-side Object Database, the object data including for example Reference Visual Features stored in the Object Database on the network-side. The Reference Visual Feature are transmitted by the Content Provider to the UE for storage in the UE's Object Database. In case the UE at a later point in time searches for the same object in its Object Database based on a calculated Visual Feature from a new Candidate Visual Area, the UE can find the object based on the newly stored Visual Feature. As with the example above the UE may augment the display information at step 808 of FIG. 8 depending on whether the Content Provider indicated the UE already has access or not.

The following description is valid for all three alternatives: UE-based Object Database, network-based Object Database or both. In case the UE does not already have access to the identified object, the UE may augment price information to a currently displayed image in a way that provides means for the user to agree to pay the price for access to the object. The means may for example be an object clickable with a mouse pointer or touchable with fingers on a touch display or an indication of a sound that needs to be made or a word that needs to be spoken by the user to agree the price. The means may optionally also represent or display a countdown time that is counting the time during which the user's view resided constantly on the object and agreement is assumed if the countdown time reaches zero.

The agreement to pay a specific price for the object may be sufficient to trigger access to the object. The following mechanism for purchase of the object without settlement of the payment may be particularly suitable. The Content Provider holds an account for every known device from which a purchase of digital content has been performed. A single account may be held for several devices, for example, when the several devices are known to belong to the same user. The account holds information about a total amount of purchases that have not been settled by the user so that a total amount due is available from the account. The total amount due is limited by the Content Provider, so that a settlement has to take place before a purchase can be performed when that purchase would result in the total amount due exceeding the limit.

The Content Provider may identify an account from the identification information substantially identifying the UE, information for which may have been provided by the UE to the Content Provider. Two alternatives for the purchase mechanism exist:

The Content Provider may transmit information about the amount the UE or user may spend before the account has to be settled which, for example, may be included in the pricing information transmitted to the UE about identified objects the user may purchase. The UE can then autonomously change the controls augmented to the displayed image from a purchase offer to a trigger for presentation of the purchased media data immediately after the user agreement to the purchase is detected. In addition, the UE updates the stored budget information to reflect the price being added to the total amount due. In parallel, the UE informs the Content Provider about the purchase including information about the purchased object and the agreed price. The Content provider can then charge the price on the account. Using this mechanism, a payment settlement arrangement may be carried out, for example, by the steps of: a. receiving information indicative of a price for permission to access the available data content from a data token stored in the UE; b. determining, based on the information from the data token, a credit worthiness indicator associated with the UE; c. providing permission to the UE to access the available data content without concurrently requiring payment for the purchases when the creditworthiness indicator satisfies predetermined conditions; d. monitoring a total outstanding purchase balance of an account associated with the information of the data token; and e. transmitting a request signal for the UE for settlement of at least a part of the total outstanding purchase balance if it exceeds a predetermined threshold amount or is outstanding for greater than a predetermined duration An alternative mechanism keeps the budget information with the Content Provider. After the user's agreement to purchase is detected at step 809 of FIG. 8, the UE informs the Content Provider about the purchased object and the agreed-to price by transmitting information at step 810, which is received by the Content Provider and stored in a database thereof in steps 905 and 906. The Content Provider can then verify whether the purchase requires settlement of the total amount or parts thereof. If no settlement is required presently, the UE receives access to the object media data and access information as a result of the object being sent by the Content Provider at step 907 of FIG. 9 and received by the UE at step 811 of FIG. 8.

At or near the time that the Content Provider provides pricing information to the UE, per steps 816 and 817 of FIG. 8 and steps 910 and 911 of FIG. 9, the Content Provider, in step 909, may optionally start transmission of the object media data, i.e. the actual content, to the UE for buffering (early download). This is done to reduce download time in the (expected) event that the user uses the changed augmented object data to finally access the content, i.e. to read the respective magazine article or watch the video. The early download may be pushed by the Content Provider or pulled, i.e. requested, by the UE from the Content Provider, as depicted by optional step 908, in return for receiving the access acknowledgement. The early download provides a better user experience as the content is available for consumption right away without needing to wait for the download right before media consumption by the user. The early download may alternatively be requested by the UE together with or shortly after the Content Provider is informed about the user's agreement to pay at step 810 of FIG. 8. In this case, the lead time for the download is bigger, and the user experience for bigger media data is even better. The early download may optionally start even before the Content Provider receives a purchase request from the UE, for example, with content that is downloaded in an encrypted form. After the user agrees to pay the price (and potentially to make a partial or full settlement), the Content Provider may provide a key for decryption to the UE.

Optionally, after a UE calculates Visual Features from Candidate Visual Areas at step 803 of FIG. 8, and before the UE transmits (a subset of) these features (in an encoded manner) to the Content Provider at step 806, it may filter the set of Visual Features at step 804 to identify those Visual Features that represent a known object of a network-based Object Database at step 805 with at least a certain likelihood. For that purpose, before the current procedure takes place, the Content Provider may provide the UE with Object Group Visual Features, potentially accompanied by Euclidian distance information, as further described below. The UE may then calculate a likelihood that the calculated Visual Features represent an object that is member of an Object Group represented by the Object Group Visual Features provided by the content provider. The calculation of the likelihood may use distance calculations between Visual Features of objects potentially present in a camera image and distance calculations between the Object Group Visual Features provided by the Content Provider. In this manner, the UE may then limit (Encoded) Visual Features transmitted to the Content Provider to those having at least a minimal likelihood to be known by the Content Provider. By this mechanism, the UE reduces the number of transmitted Visual Features, as well as the calculation burden on and the response time of the Content Provider. For this enhancement, the UE may have some additional calculation burden, but should be limited as a result of the limited number of object groups involved. Also, digital vector information of an Object Group Visual Feature can be formed so that it allows easy distance calculation, e.g., it may comprise a high number of zero-entries, it may be shorter than the Visual Features and distance calculation, or may only require a part of the Visual Feature to be taken into account.

The Content Provider may conveniently update the UE with Object Group information and Object Group Visual Features whenever demanded by new entries in the Object Database or changes in the layout or design of object groups.

In the event that two or more objects are identified from Visual Features received at step 901 of FIG. 9, a relation between the objects may lead to common access conditions or common purchase options, which may be transmitted to the UE at step 904. The UE, after receiving the common access or purchase information at step 807 of FIG. 8, may augment the information or media pieces relating to the information to a currently displayed camera image in relation to the multiple objects. As an example, if multiple magazine issues of the same title are identified in a single camera image, the UE may receive a subscription option that includes access to all identified magazines. The purchase or access information preferably comprises information relating to all objects it relates to, so that the UE is enabled to augment the information appropriately. The advantage of this in cases where multiple related objects are present in a camera image is a cleaner presentation of purchase options (single versus multiple purchases), and a purchase option that seems more individual to the user and more attractive.

Figure 10:
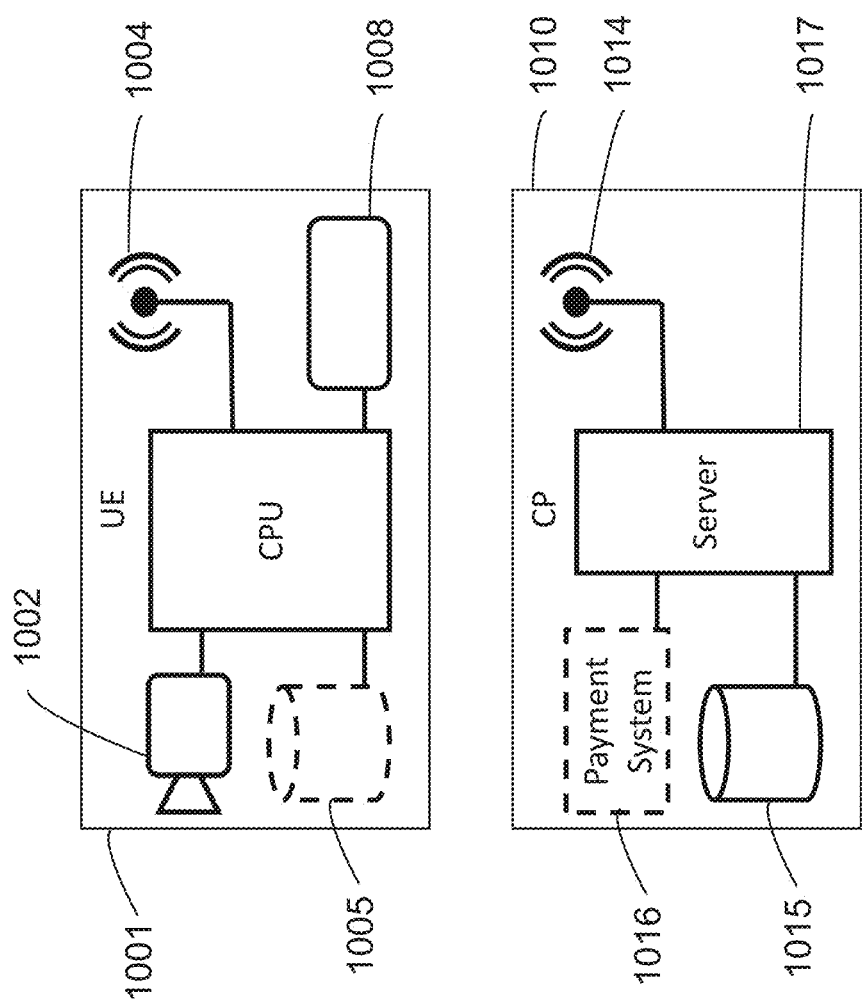
FIG. 10 presents a schematic diagram illustrating a UE and a CP configured for use in accordance with aspects of the present disclosure.

FIG. 10 shows a UE 1001 and a Content Provider 1010, the latter being a notation for the network-side entities involved in any deployment of this inventions. The UE 1001 comprises at least one camera 1002 and a display or an external connection to display means 1008. The UE 1001 has transmission and reception means 1004 to connect and transmit data to and receive data from a network which connects the UE 1001 to the Content Provider 1010. The UE 1001 may have an Object Database 1005 for some embodiments of this invention. The network has an Object Database 1015, transmission and reception means 1014 and, optionally, a payment system 1016 that holds an account for UEs 1001 and/or associated users of the system. The functionality of the payment system 1016 may alternatively be implemented in a server 1017 of the Content Provider 1010 which interconnects the different entities of the Content Provider 1010 and which may perform calculations for object detection.

Figure 2:
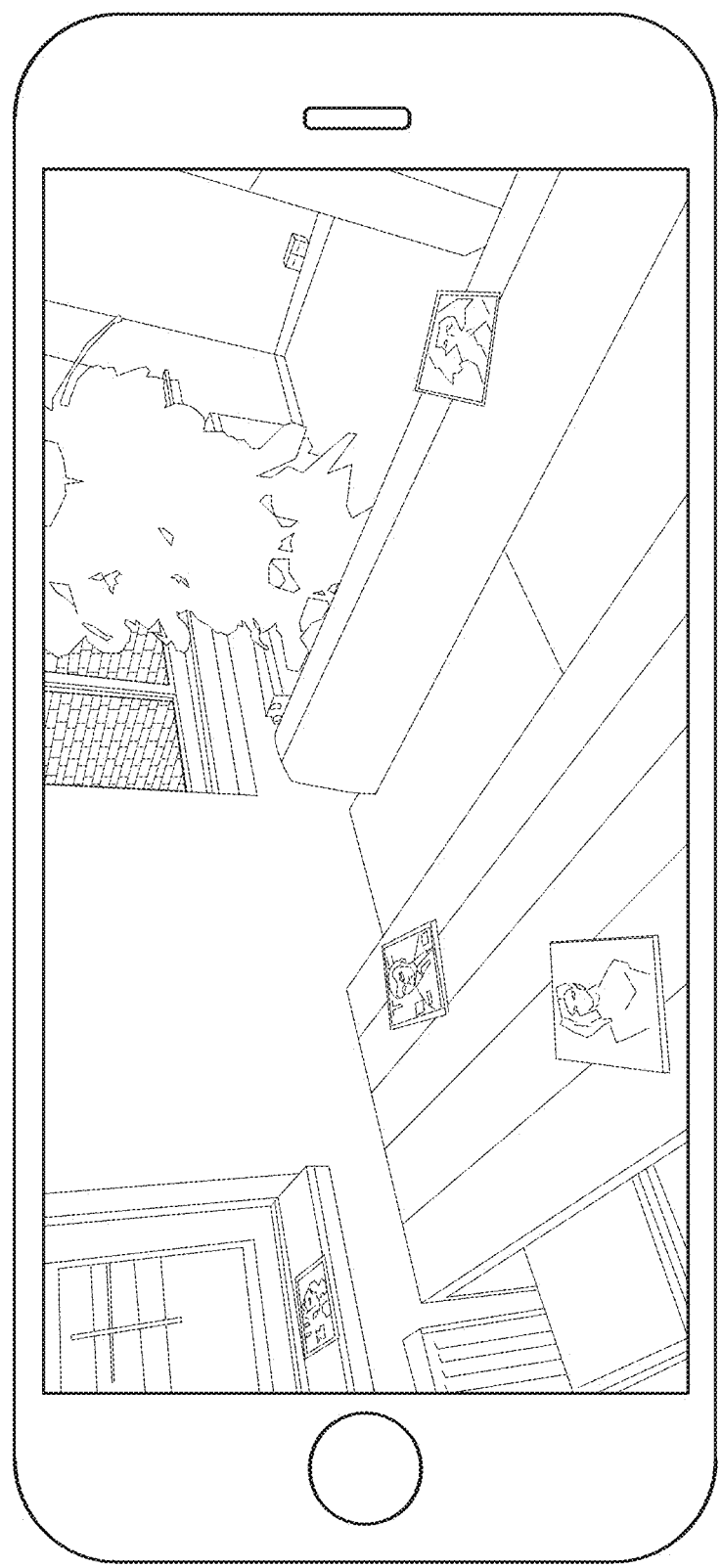
FIG. 2 presents the camera image of camera 1 as may be scanned and displayed by a smartphone.

FIG. 1 shows a sketch of a scene as it may be taken by the camera of a smartphone (UE). The UE may analyze the camera image for areas that may show objects of interest, i.e. objects that are media objects a digital copy of which may be offered to the user of the UE. FIG. 2 shows a UE in landscape orientation displaying a current camera image of its environment which is the environment shown in FIG. 1.

The UE may for example analyze the camera image for rectangular objects filled with a structure significantly different from the surrounding environment. The objects, as they are not all in a plain orthogonal orientation to the camera Z-axis, appear as tetragon-shaped areas in the camera image that are defined as Candidate Visual Areas. The strategy to find Candidate Visual Areas that may have additional parameters and may be more sophisticated, e.g. search for general polygon objects and use pre-defined information about structures to search for.

Figure 3:
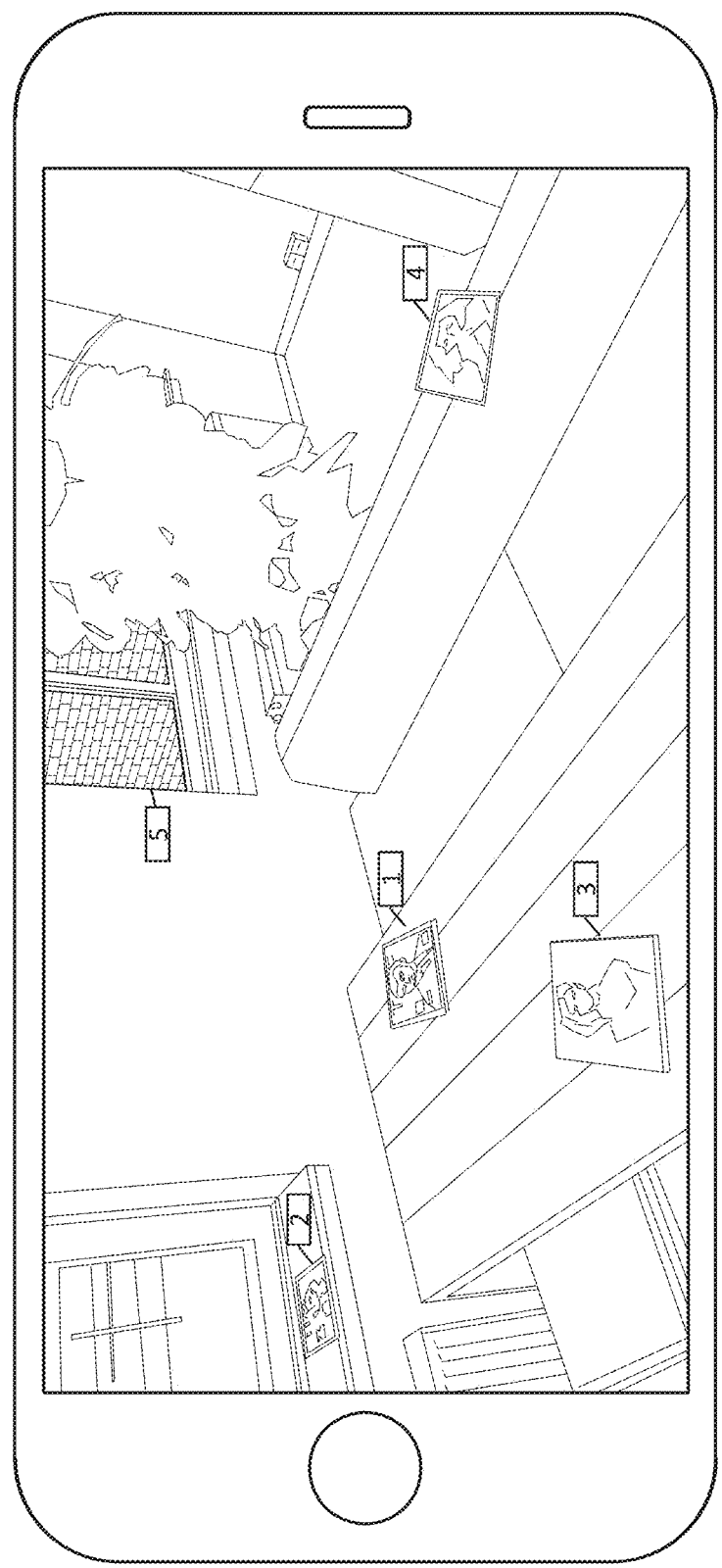
FIG. 3 further depicts the camera image of FIG. 2.

For example, the UE may find five Candidate Visual Areas as depicted in FIG. 3. For each of these areas 1 through 5, the UE may calculate a Visual Feature VFi according to a binary descriptor ORB briefly introduced below:

$$VF_i = \begin{bmatrix} VF_{i,1} \\ VF_{i,2} \\ \vdots \\ VF_{i,256} \end{bmatrix}, i = 1 \ldots 5$$

Oriented FAST and rotated BRIEF (ORB) is a fast, robust local feature detector, first presented by Ethan Rublee et al. in 2011 ["ORB: an efficient alternative to SIFT or SURF", IEEE International Conference on Computer Vision (ICCV), 2011], that can be used in computer vision tasks like object recognition or 3D reconstruction. It is based on the FAST keypoint detector and the visual descriptor BRIEF (Binary Robust Independent Elementary Features). Within these algorithms, once and interesting part, e.g. Candidate Visual Areas, are found in an image, parameters are extracted known as a feature descriptor or feature vector. In the example above, 256 elements form the feature vector Visual Feature VFi.

The UE may have received and stored Object Group Visual Features which can be used to verify which of the Candidate Visual Areas 1 through 5 may comprise objects of interest. For example, there may be 6 Object Group Visual Features (OGVF) stored in the UE $$OGVF_j = \begin{bmatrix} OGVF_{j,1} \\ OGVF_{j,2} \\ \vdots \\ OGVF_{j,256} \end{bmatrix}, j = 1 \ldots 6$$

and the Euclidean Distance may be the measure that is compared to a threshold T to derive whether a respective Candidate Visual Areas shows an object of interest or not.

$|VF_i - OGVF_j| \leq T$ for any $j=1 \ldots 6$

In the current example, the Object Group Visual Features contain six magazine cover designs, two of which match at least one of the Visual Features of Candidate Visual Areas 1 to 4. As a result, Candidate Visual Area 5 in FIG. 3 (which is not a magazine cover) is not verified to show an object of interest.

The UE may now encode the Visual Features VFi for i=1 . . . 4 (ignoring VF5) to compress the information and eliminate redundancy. The resulting Encoded Visual Features EVFi are then submitted to the Content Provider. As a further option, the UE may alternatively transmit the (potentially encoded) actual image of the Candidate Visual Area to the Content Provider. There, the Visual Features may be decoded, i.e. decompressed, and the Object Database of the Content Provider can be searched for Visual Features that match with high likelihood the Visual Features VFi provided by the UE.

The search strategy may include one or more known search algorithms. The search result may not be unique, as several good matches for any of the Visual Features may be found. So, the Content Provider may add an additional step of finding one best match based on the actual images of the found candidate objects and on the Candidate Visual Areas, if provided by the UE. Alternatively, the Content Provider may transmit to the UE image data of the candidate object found, so that the UE may perform the final match of the image data with the Candidate Visual Areas determined from the camera image.

The Content Provider may determine, based on the object data by the UE provided by the UE or otherwise determined by the Content Provider, whether the UE already has access to an identified object. The UE may have access if the object was purchased by the UE in the past or if the UE has subscribed a content delivery plan that includes access to the object. The content delivery plan may for example be time limited, e.g. a day, one week or one month, or it may be open-ended unless and until the subscription terminates.

In any case, the Content Provider transmits to the UE data relating to the candidate objects identified from the Object Database of the Content Provider. The data may comprise Reference Visual Features for storage in the UE for future identification of object in the UE. The data may comprise one or more of an image representing the object and abstract or trailer information.

If the Content Provider determines that the UE does not have access to the object, the data may comprise conditions for getting access which may consist of price information and purchase conditions, for example including a one-time or open-ended purchase of the object or time-limited access to multiple objects including the object of interest.

If the Content Provider determines that the UE has access to the object, the data will comprise access information, for example provided as a link to download the media data of the object or a script that when executed downloads the media data.

In the example described herein, the UE is determined to have access to the objects shown in Candidate Visual Areas 1 and 4, and the UE does not have access to the objects of areas 2 and 3. The Content Provider transmits object data to the UE comprising a title and issue information, potentially cover images of the respective objects, and for objects 2 and 3, price information for a single purchase.

Figure 4:
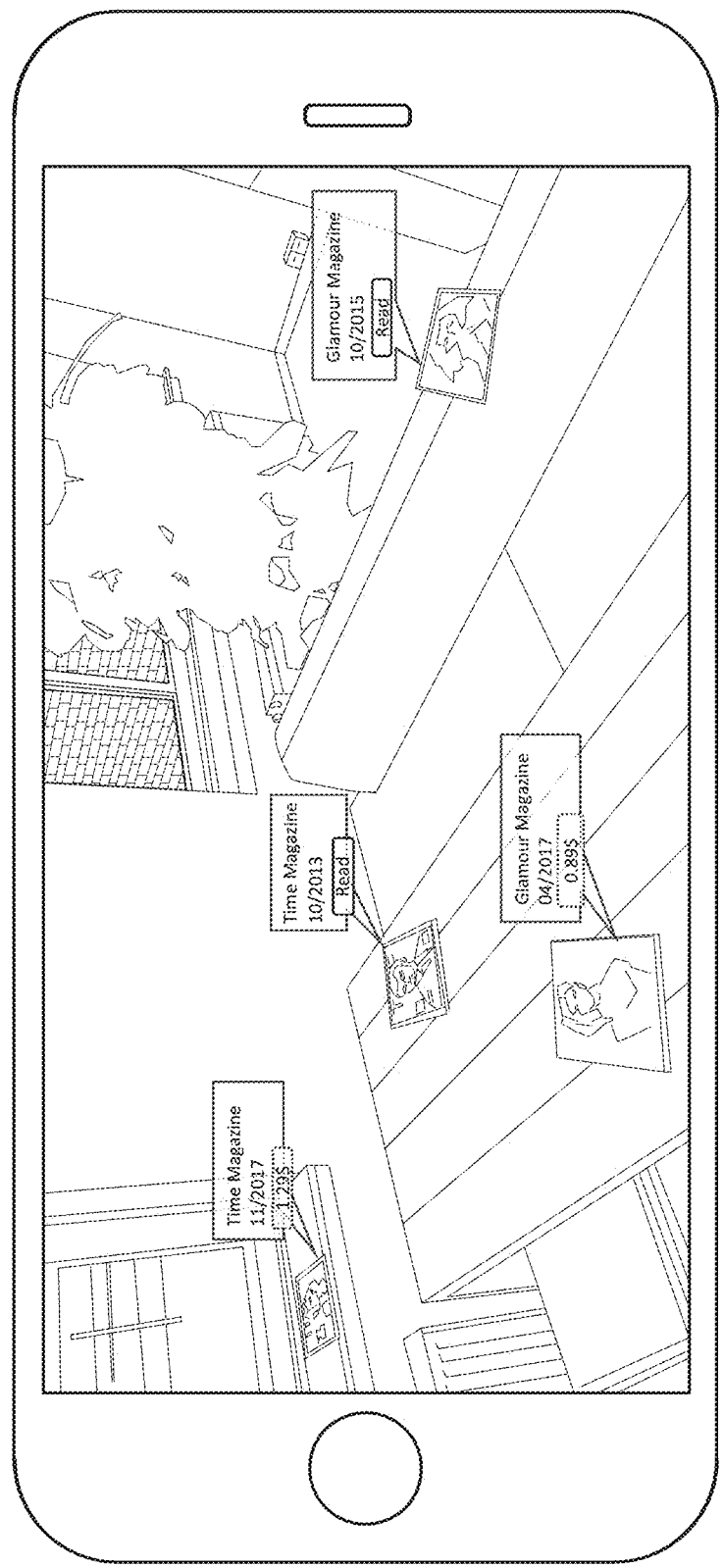
FIG. 4 depicts the camera image of FIG. 2 with augmented features.

The UE may now augment the received data into the currently displayed image in accordance with step 812 in FIG. 8, which may result in a displayed image according to FIG. 4. In FIG. 4, the currently displayed scene is shown augmented by title and issue information, and for objects 2 and 3, a price shown imprinted on a button that allows the user to agree on the price and thus purchase the object for reading. For objects 1 and 4, a similar button is shown that allows the user to directly read the digital media related to the object by pressing the button.

Figure 5:
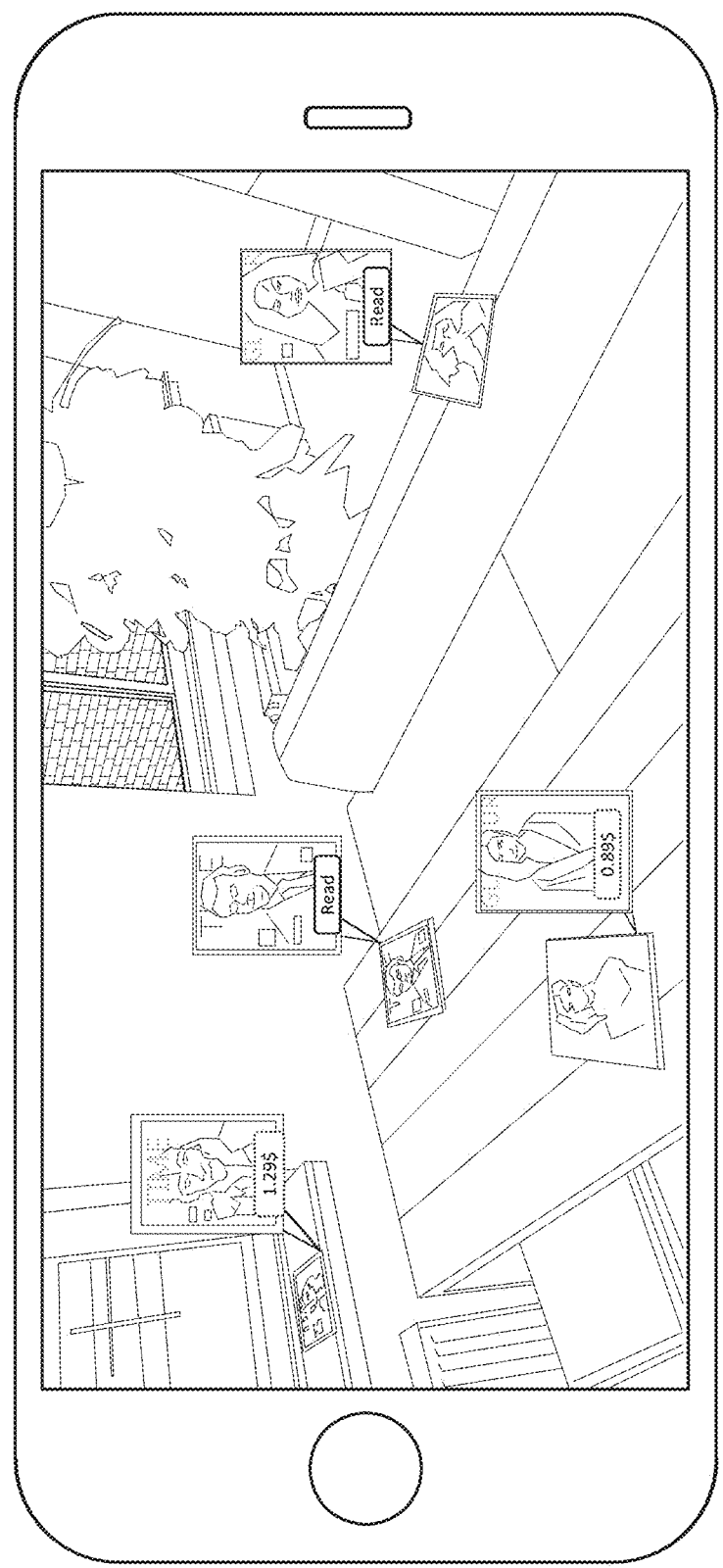
FIG. 5 depicts the camera image of FIG. 2 with augmented features alternative to those depicted in FIG. 4.

In an alternative embodiment, the UE may augment a cover image next to the objects to allow easier recognition and attract the user to reading the media as shown in FIG. 5. An important aspect of this invention is the combination of the augmented control, in this case a button showing the price information and triggering a purchase when pressed, with the following mechanism: When the user indicates agreement to the shown price and triggers a purchase, in the example, by pressing any of the buttons showing a price (the detection of which is represented by step 813 in FIG. 8), media consumption is directly possible without any more user interaction. This is achieved by charging the agreed-to price onto the UE's account, for example, without a necessity for the user to settle the account. This mechanism is described in more detail further below.

The result of agreement to pay a price may be a change of the shown button into a button for direct reading as illustrated for objects 1 and 4. Another alternative of the result is a direct start of an application on the UE that allows media consumption, i.e. a magazine reader is started that loads the media data of the object and presents it to the user, as is represented by steps 814 and 815 in FIG. 8. Another alternative is the augmentation of a media rendering starting directly after the user agrees to pay the price, the augmentation showing text, pictures and/or video information augmented to the currently displayed camera image and the augmentation providing means such as touch sensitive areas that allow a control of the media rendering. In this manner, media consumption and augmentation of media can start immediately after the user agrees to pay a price, while the UE is still in the augmented display of the user's environment. The user may for example control the media rendering to scroll in a document or to change the view to a full-screen rendering, thereby leaving the augmentation mode.

Different alternative mechanisms for agreement to the price and resulting changes of the augmented display are shown in FIGS. 6 and 7. FIG. 6*a* depicts a clip of the image displayed on the UE shown in FIG. 5 with an alternative of augmented images and controls. FIG. 6 shows object 3 (as labeled in FIG. 3), the respective Candidate Visual Area and an augmented cover picture of the magazine identified by the Content Provider with an imprinted price information (0.89 US$). In addition, a circle ("countdown timer") is shown with a countdown time of 4 (seconds). Now, assume the UE has image analysis means that allows tracking of the user's view, i.e. the UE can determine which part of the display the user is currently focused on. For example, the UE may comprise a virtual reality ("VR") or augmented reality) ("AR") headset with eye tracking capability. See, e.g., www.cnet.com/tech/computing/watching-me-watching-you-how-eye-tracking-is-coming-to-vr-and-beyond/, last accessed on Aug. 18, 2022. Alternatively, the UE may comprise a smartphone operable to transmit UE display screen information and user gaze information obtained from images produced by a front facing camera of the smartphone over a network to a server configured to determine the part of the display the user is currently focused on. As an alternative to gaze detection, the smartphone may rely on another indicator to determine user focus, for example, a prolonged touching by the user of the touchscreen in the vicinity of the part of the display that the user is focused on.

For every complete second the user focuses on the circle or the cover of the magazine or any other specific point on the display, the countdown timer counts down one time unit to zero. Whenever the user loses focus or focuses on another part of the display or any point outside the display, the countdown is reset. FIGS. 6B and 6C show the augmented image shown on the display after a consecutive focus of one and three seconds, respectively. After the countdown reaches zero, the user's agreement to pay the displayed price and thus purchase the object has been expressed, and the UE acts accordingly. The augmented display changes permanently to the view shown in FIG. 6D where a control button allows reading of the media related to object 3.

Figure 7A:
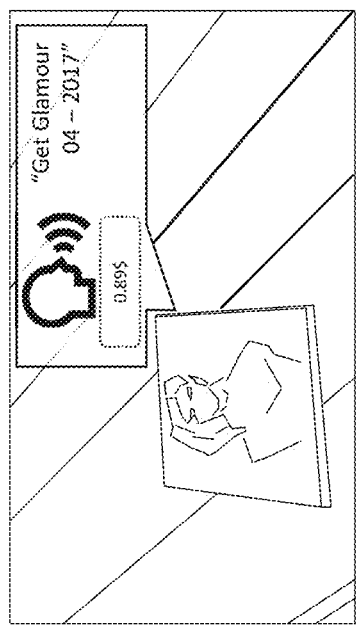
FIGS. 7A, 7B depict another mechanism for selecting data content depicted in FIG. 5 in accordance with aspects of the present disclosure.
Figure 7B:
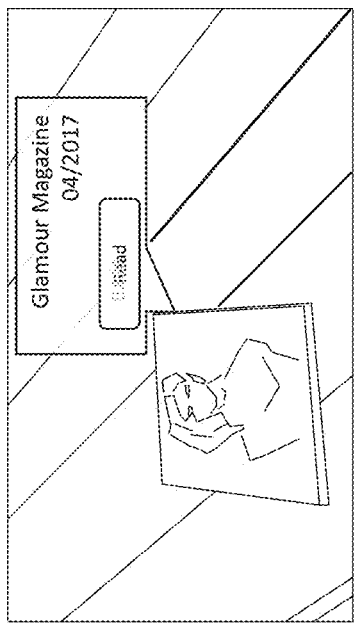

Another alternative for price agreement is shown in FIGS. 7A and 7B. In FIG. 7A, an icon is shown that prompts the user to loudly say the words that are written next to the icon: "Get Glamour 04-2017". The UE's voice recognition means will detect the short text once spoken out loudly, and if the short text is detected, the user's agreement to pay the displayed price and thus purchase the object has been expressed, and the UE acts accordingly. The augmented image displayed may change to a view that offers direct reading.

Figure 6A:
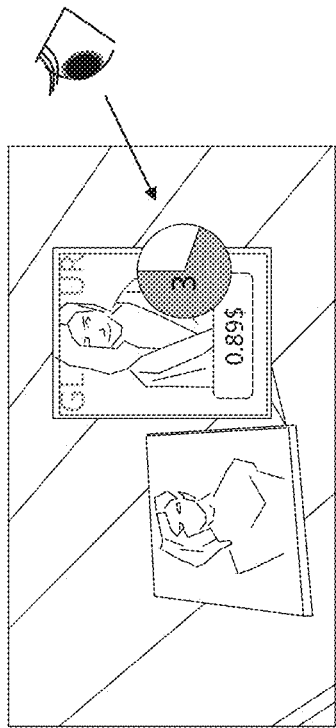
FIGS. 6A-6D depict a mechanism for selecting data content depicted in FIG. 5 in accordance with aspects of the present disclosure.
Figure 6B:
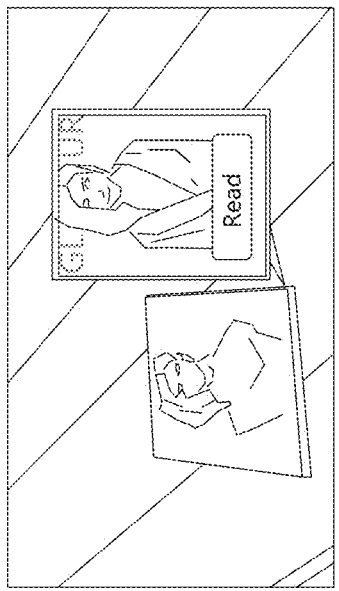
Figure 6C:
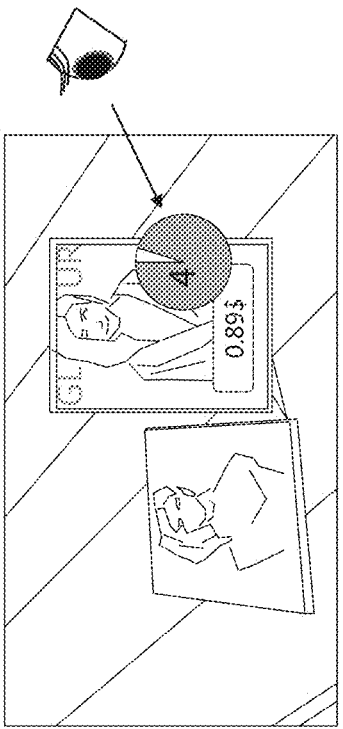
Figure 6D:
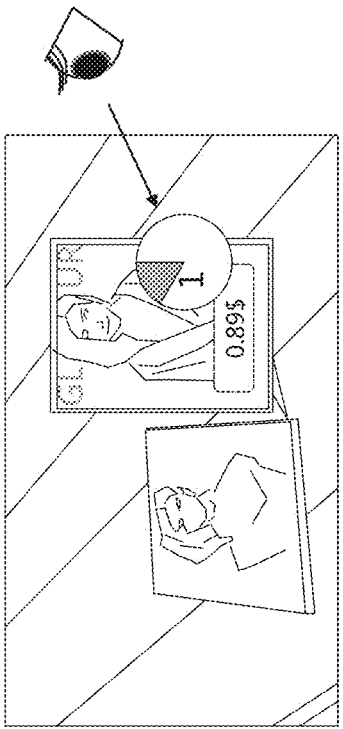
Figure 12:
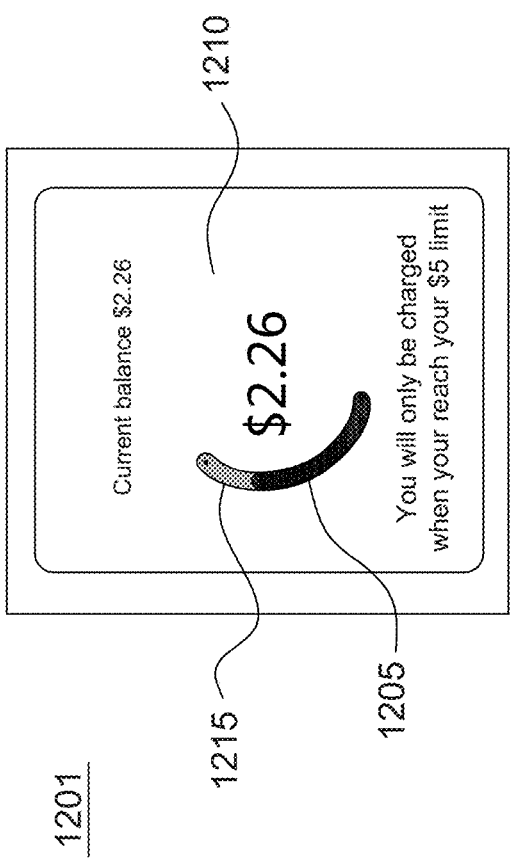
FIG. 12 depicts an advantageous exemplary transaction status indicator image useable in accordance with the aspects of the present disclosure.

FIG. 12 depicts an exemplary transaction status indicator 1201, which operates as a multi-function transaction management widget to provide multiple aspects of a virtual tab, and which may advantageously be used instead of the countdown timer circle of FIGS. 6A-6C. The transaction status indicator 1201 may preferably provide multiple indicating functions to the user including, for example, (a) displaying the current level of amount owed on the virtual tab indicated by a black arc or portion 1205 of an Omega circle 1210, and by the amount 1205 of "$2.26" depicted therein; and (b) a gray arc or portion 1215 of the Omega circle 1210 extending in a clockwise direction from the portion 1205 indicating the cost for the associated digital content of magazine of FIGS. 6A-6C, i.e., $0.89 (not drawn to scale), wherein the entire length of the Omega Circle 1210 represents the threshold of, for example, $5.00, which when reached will trigger a requirement for the user to settle her/his virtual tab.

In FIG. 12, for example, when UE tracks the user's gaze or touch relative to the UE display, and when the user gaze or touch is directed to the cover of the magazine, virtual depicted price, or any other specific point on the display, the transaction status indicator 1201 appears and for every complete second the user gazes at or touches on the Omega circle 1210 or the cover of the magazine or any other specific point on the display, the portion 1220 of the Omega circle 1210 portion may transition from a lighter grey to progressively darker grey, and then to black over a time duration of, for example, four seconds, to confirm that the user's agreement to pay the displayed cost or price (when his virtual tab reaches the threshold amount, e.g., $5,00, for the purchase of the digital copy of the magazine, and the UE acts accordingly for receipt of such digital magazine copy.

Similar to the embodiment of FIGS. 6A-6D, whenever the user loses focus or touch, or focuses on and/or touches another part of the display or any point outside the display during such purchase confirmation period, the transaction status indicator 1201 is reset back to the prior balance of $2.26, effectively canceling the transaction for purchasing the digital copy of the magazine for a commitment to pay the $0.89. Assuming that the user does not lose focus or touch and does not cancel the transaction, then the next time the user seeks to purchase digital content using the UE in accordance with this disclosure, the Omega circle of the transaction status indicator will include a stated balance and a black portion corresponding to $3.15, i.e., $2.26 plus the $0.89 of the recent purchase.

While the transaction status indicator of FIG. 12 is illustrated in the form of an Omega circle and expressing U.S. dollar amounts, these also may be presented with alternate symbols including, for example, indicators of other shapes, such as bar(s) inclined or declined lines, and showing other currencies or currency amounts. Further, the exemplary operation of the transaction status indicator 1201 as shown in FIG. 12 for the purpose of transitioning of the Omega circle portion 1220 from a lighter grey to progressively darker grey, and then to black to confirm that the user's agreement to pay the displayed price is for illustration purposes only, and such confirmation process may employ other colors, shading, outlines, animation, and/or audio visual schemes for the time period to enable a user to easily understand the time remaining for confirming a purchase by using her/his gaze or touch.

The use of the transaction status indicator in accordance with this disclosure advantageously not only enables users to quickly execute transactions with deferred payment recorded on a virtual tab, but also beneficially depicts a current amount on such virtual tab, and may further reflect, for example, credit, discount or voucher provided to or earned by the user, for example, by depicting a corresponding segment of the Omega circle in a different color, pattern or shading, or outline of such segment highlighted in in a different color, pattern or shading. In another embodiment, such credit, discount or voucher may be earned by the by watching an advertisement.

Although the above describes that the user's gaze or relative to the UE display causes the display of, and enables the interaction with, the transaction status indicator 1201 of FIG. 12, it is possible to employ other methods and user interactions for causing the appearance and interaction with the transaction status indicator in accordance with the present disclosure including, for example, causing the transaction status indicator to appear on the display when the virtual depicted price is displayed, or when the UE detects an activity of the user indicative that the user may be attempting to select an item (with depicted price) for purchase.

Detection of such activity by the user indicative that the user may be attempting to select an item may include, for example, detecting a user touching a touch-sensitive display of the user device at a location proximate the cover of the magazine, virtual depicted price, or any other specific point on the display; detecting movement of the UE such that a depicted fixed selection pointer on the display of the user device is at a location proximate a displayed one of the magazine or specific point captured by the UE camera; or detecting that the user caused movement of a depicted moveable pointer on the UE display to a location proximate the magazine, virtual depicted price, or any other specific point on the display.

Likewise, although the methods of the present disclosure described above relied on a user's gaze at, or touch on the display for a predetermined time to confirm a purchase, it is possible to employ other methods and user interactions to confirm a purchase in accordance with the present disclosure including, for example, detecting that the user caused movement of a depicted moveable pointer on the display of the user device to the transaction status indicator, virtual depicted price, magazine cover or at a predetermined transaction confirmation location.

Other alternative augmented control and display options are envisioned in accordance with aspects of the present disclosure. A common aspect among alternatives is that for identified and available objects, controls are augmented to a displayed image, which allow the user to express his or her willingness to pay a shown price and purchase the digital media object. Once the agreement is expressed by the user, access to the media is granted almost immediately, substantially without requesting the user to be securely authenticated and without the payment to be actually performed.

Figure 11:
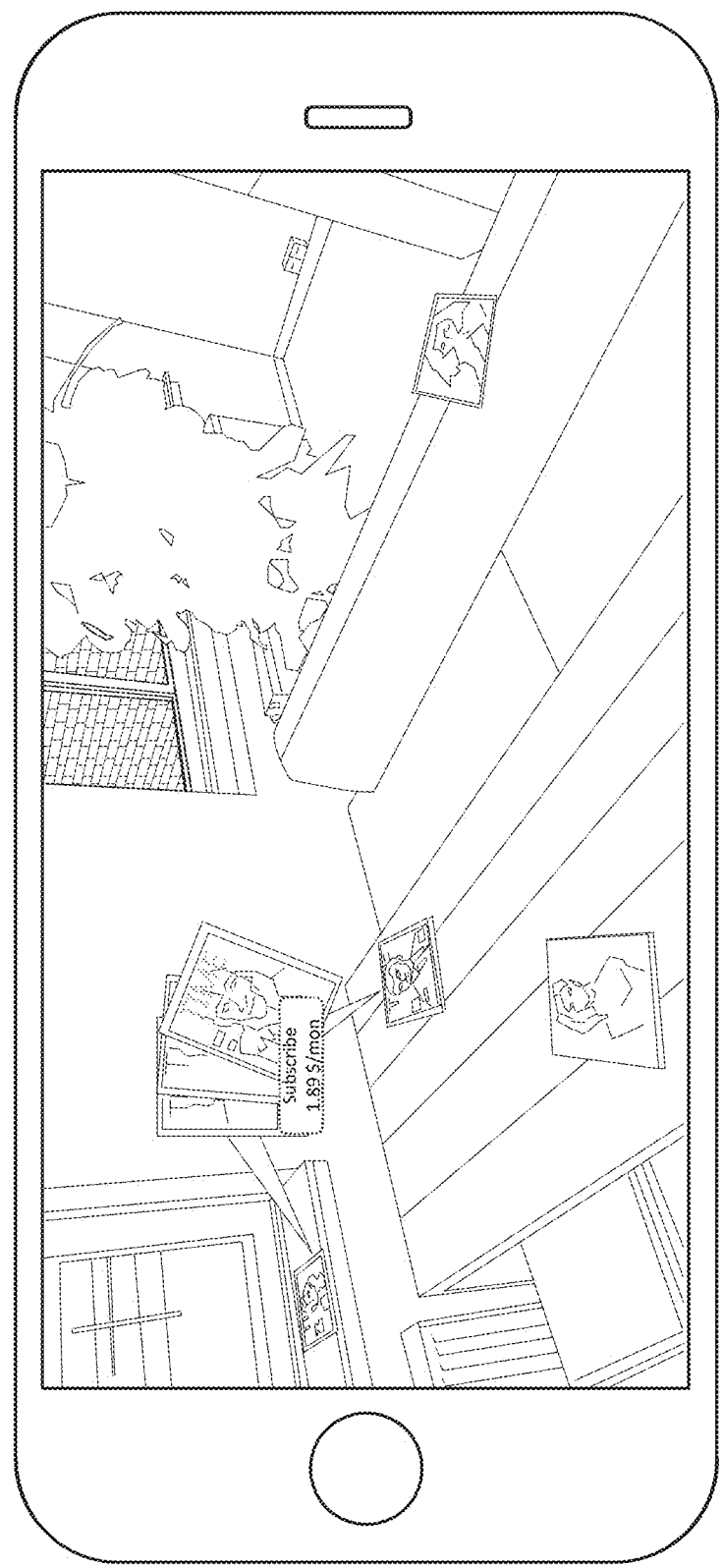
FIG. 11 depicts a mechanism for selecting data content depicted in FIG. 2 in accordance with aspects of the present disclosure.

Another common aspect is associated with the identification of objects from the Object Database that are related to each other. As an example, objects 1 and 2 in FIG. 3 are from the same magazine title, and one purchase option may be to buy the two issues for a single price or to subscribe to the magazine with the shown issues included in the subscription. This information may be determined by the Content Provider and transmitted to the UE, for example, so that the UE may augment a purchase offer related to both respective Candidate Visual Areas as depicted in FIG. 11. In this case, a single subscription option is provided, and a simple agreement to the option (and the related price) will provide immediate access to the media.

We claim:

1. A computer-implemented method for providing a user device access to data content comprising the steps of:

processing a camera image generated by the user device, said image of an environment to identify at least one candidate visual area therein;

processing the at least one identified candidate visual area to further identify visual features to be evaluated as indicative of available data content;

filtering the identified visual features to identify those visual features that represent a known object group of a network-based object database;

comparing the filtered visual features to visual features of at least one data object maintained by the database, said data objects indicative of respective available data content;

determining based on the comparing step, the at least one data object that corresponds to the filtered visual features;

determining whether said user device has permission to gain access to available data content corresponding to the determined at least one data object that corresponds to the identified visual features;

generating instructions to augment a display of the camera image with selectable image features associated with the determined at least one data object that corresponds to the identified visual features of the at least one candidate visual area, said instructions to augment the display of the camera image with the selectable image features proximate to the corresponding at least one candidate visual area, said selectable image features indicative of whether or not the user device has permission to access to the data content corresponding to the at least one data object;

generating instructions to further augment the display when the user device does not have permission to access to the data content, the instructions generated to provide (a) a transaction status indicator icon, wherein the transaction status indicator icon indicates (i) a respective cost for access to the data content of one of the data objects, (ii) a predetermined maximum threshold amount before triggering a payment settlement requirement, and (iii) any prior unsettled payment obligations, and (b) upon detection and tracking by the user device of a selection confirmation activity by the user, changing a displayed aspect of the depicted status indicator icon to provide a countdown timer while the selection confirmation activity is continuously performed for a predetermined time duration to confirm the user's intent to purchase access to the digital content corresponding to the data object associated when the selectable image feature, wherein the selection confirmation activity by the user comprises detection by the user device of at least one of (i) a user touching a touch-sensitive display of the user device at a location proximate a displayed one of the selectable image features or at a predetermined transaction confirmation location, (ii) movement of the user device such that a depicted fixed selection pointer on the display of the user device is at a location proximate a displayed one of the selectable image features, (iii) the user causing movement of a depicted moveable pointer on the display of the user device to a location proximate a displayed one of the selectable image features or to a predetermined transaction confirmation location, and (iv) the user's view is focused on one of the selectable image features or to the predetermined transaction confirmation location;

upon the user device's detection and tracking of the user selection activity for the predetermined duration time, transmitting a transaction authorization signal to a content provider offering the digital content of the selected data object without concurrently requiring payment for the transaction, when a total aggregate cost is less than the predetermined maximum amount; and executing a payment settlement arrangement for the user device for settlement of at least a part of the total aggregate cost including the cost of the intended purchase when the total aggregate cost would be equal to or are greater than the predetermined maximum amount, and upon such payment settlement, transmitting a transaction authorization signal to the content provider offering the digital content corresponding to the data object associated with the viewed selectable image feature.

2. The method of claim 1, wherein the step of generating instructions to further augment the display further comprises causing the display to depict the transaction status indicator icon when the user device detects an activity of the user indicative that the user may be attempting to select one of the selectable image features.

3. The method of claim 2 wherein the activity of the user indicative that the user may be attempting to select one of the selectable image features comprises detecting that a user's view is focused on one of the selectable image feature.

4. The method of claim 2 wherein the activity of the user indicative that the user may be attempting to select one of the selectable image features comprises detecting a user touching a touch-sensitive display of the user device at a location proximate a displayed one of the selectable image features.

5. The method claim 2 wherein the activity of the user indicative that the user may be attempting to select one of the selectable image features comprises detecting movement of the user device such that a depicted fixed selection pointer on the display of the user device is at a location proximate a displayed one of the selectable image features.

6. The method claim 2 wherein the activity of the user indicative that the user may be attempting to select one of the selectable image features comprises detecting that the user caused movement of a depicted moveable pointer on the display of the user device to a location proximate a displayed one of the selectable image features.

7. The computer-implemented method of claim 1 further comprising the step of updating information for generating a next image of the transaction status indicator icon to reflect any payment settlement.

8. The computer-implemented method of claim 1, wherein the transaction status indicator icon further indicates at least one of a credit amount, discount or voucher.

9. The computer-implemented method of claim 1, wherein the implementing a payment settlement arrangement comprises the steps of:

receiving information indicative of a cost for permission to access the available data content corresponding to the selected image feature and information from a data token;

in response to receiving an indicator from the user device corresponding to an agreement to pay the indicated cost, determining, based on the information from the data token, a credit worthiness indicator associated with the user device;

providing permission to the user device to access the corresponding available data content without concurrently requiring payment for the purchases when the credit worthiness indicator satisfies predetermined conditions;

monitoring a total outstanding purchase balance of an account associated with the information of the data token; and transmitting a request signal for the user device for settlement of at least a part of the total outstanding purchase balance of the account associated with the information of the data token if the total outstanding purchase balance exceeds a predetermined threshold amount or is outstanding for greater than a predetermined duration.

10. The computer-implemented method of claim 9 wherein the data token is an identifier of the user device.

11. The computer-implemented method of claim 9 wherein the step of providing permission to access data content is performed in absence of registration or login to a payment system by a user associated with the user device.

12. The computer-implemented method of claim 9 wherein the step of providing permission to access data content is performed in absence of identifying a user associated with the user device.

13. A computer-implemented method for providing a user device access to data content comprising the steps of:

processing a camera image generated by the user device, said image of an environment to identify at least one candidate visual area therein;

processing the at least one identified candidate visual area to further identify visual features to be evaluated as indicative of available data content;

comparing the identified visual features to be evaluated as indicative of available data content relative to visual features of at least one data object maintained by a database, said data objects indicative of respective available data content;

determining based on the comparing step, the at least one data object that corresponds to the identified visual features of the at least one candidate visual area;

determining whether said user device has permission to gain access to available data content corresponding to the determined at least one data object that corresponds to the identified visual features;

generating instructions to augment a display of the camera image with selectable image features associated with the determined at least one data object that corresponds to the identified visual features of the at least one candidate visual area, said instructions to augment the display of the camera image with the selectable image features proximate to the corresponding at least one candidate visual area, said selectable image features indicative of whether or not the user device has permission to access to the data content corresponding to the at least one data object;

generating instructions to further augment the display when the user device does not have permission to access to the data content, the instructions generated to provide (a) a transaction status indicator icon, wherein the transaction status indicator icon indicates (i) a respective cost for access to the data content of one of the data objects, (ii) a predetermined maximum threshold amount before triggering a payment settlement requirement, and (iii) any prior unsettled payment obligations, and (b) upon detection and tracking by the user device of a selection confirmation activity by the user, changing a displayed aspect of the depicted status indicator icon to provide a countdown timer while the selection confirmation activity is continuously performed for a predetermined time duration to confirm the user's intent to purchase access to the digital content corresponding to the data object associated when the selectable image feature, wherein the selection confirmation activity by the user comprises detection by the user device of at least one of (i) a user touching a touch-sensitive display of the user device at a location proximate a displayed one of the selectable image features or at a predetermined transaction confirmation location, (ii) movement of the user device such that a depicted fixed selection pointer on the display of the user device is at a location proximate a displayed one of the selectable image features, (iii) the user causing movement of a depicted moveable pointer on the display of the user device to a location proximate a displayed one of the selectable image features or to a predetermined transaction confirmation location, and (iv) the user's view is focused on one of the selectable image features or to the predetermined transaction confirmation location;

upon the user device's detection and tracking of the user selection activity for the predetermined duration time, transmitting a transaction authorization signal to a content provider offering the digital content of the selected data object without concurrently requiring payment for the transaction, when a total aggregate cost is less than the predetermined maximum amount; and executing a payment settlement arrangement for the user device for settlement of at least a part of the total aggregate cost including the cost of the intended purchase when the total aggregate cost would be equal to or are greater than the predetermined maximum amount, and upon such payment settlement, transmitting a transaction authorization signal to the content provider offering the digital content corresponding to the data object associated with the viewed selectable image feature.

14. The method of claim 13, wherein the step of generating instructions to further augment the display further comprises causing the display to depict the transaction status indicator icon when the user device detects an activity of the user indicative that the user may be attempting to select one of the selectable image features.

15. The method of claim 14 wherein the activity of the user indicative that the user may be attempting to select one of the selectable image features comprises detecting that a user's view is focused on one of the selectable image feature.

16. The method of claim 14 wherein the activity of the user indicative that the user may be attempting to select one of the selectable image features comprises detecting a user touching a touch-sensitive display of the user device at a location proximate a displayed one of the selectable image features.

17. The method claim 14 wherein the activity of the user indicative that the user may be attempting to select one of the selectable image features comprises detecting movement of the user device such that a depicted fixed selection pointer on the display of the user device is at a location proximate a displayed one of the selectable image features.

18. The method claim 14 wherein the activity of the user indicative that the user may be attempting to select one of the selectable image features comprises detecting that the user caused movement of a depicted moveable pointer on the display of the user device to a location proximate a displayed one of the selectable image features.

19. The computer-implemented method of claim 13 further comprising the step of updating information for generating a next image of the transaction status indicator icon to reflect any payment settlement.

20. The computer-implemented method of claim 13, wherein the implementing a payment settlement arrangement comprises the steps of:
receiving information indicative of a cost for permission to access the available data content corresponding to the selected image feature and information from a data token;
in response to receiving an indicator from the user device corresponding to an agreement to pay the indicated cost, determining, based on the information from the data token, a credit worthiness indicator associated with the user device;
providing permission to the user device to access the corresponding available data content without concurrently requiring payment for the purchases when the credit worthiness indicator satisfies predetermined conditions;
monitoring a total outstanding purchase balance of an account associated with the information of the data token; and
transmitting a request signal for the user device for settlement of at least a part of the total outstanding purchase balance of the account associated with the information of the data token if the total outstanding purchase balance exceeds a predetermined threshold amount or is outstanding for greater than a predetermined duration.

21. The computer-implemented method of claim 20 wherein the data token is an identifier of the user device.

22. The computer-implemented method of claim 20 wherein the step of providing permission to access data content is performed in absence of registration or login to a payment system by a user associated with the user device.

23. The computer-implemented method of claim 20 wherein the step of providing permission to access data content is performed in absence of identifying a user associated with the user device.

24. The computer-implemented method of claim 20, wherein the transaction status indicator icon further indicates at least one of a credit amount, discount or voucher.

* * * * *